Jan. 27. 1925.  
S. G. WRAY  
COMBINED VAPORIZER AND BURNER  
Filed July 5, 1923

1,524,465

S. G. Wray, Inventor

Attorney

Patented Jan. 27, 1925.

1,524,465

UNITED STATES PATENT OFFICE.

SILAS G. WRAY, OF OLYMPIA, WASHINGTON.

COMBINED VAPORIZER AND BURNER.

Application filed July 5, 1923. Serial No. 649,544.

*To all whom it may concern:*

Be it known that I, SILAS G. WRAY, a citizen of the United States, residing at Olympia, in the county of Thurston and State of Washington, have invented a new and useful Combined Vaporizer and Burner, of which the following is a specification.

This invention relates to a combined vaporizer and burner designed primarily for use with kerosene and other heavy hydrocarbon oils as a fuel, the burner and vaporizer being especially useful in stoves, furnaces and the like.

An object of the invention is to provide a simple, durable and compact structure that can be made readily and the parts of which can be separated for the purpose of cleaning or repairing them.

Another object is to provide a structure which will quickly vaporize heavy hydrocarbon oils, thereby producing intense heat.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1:
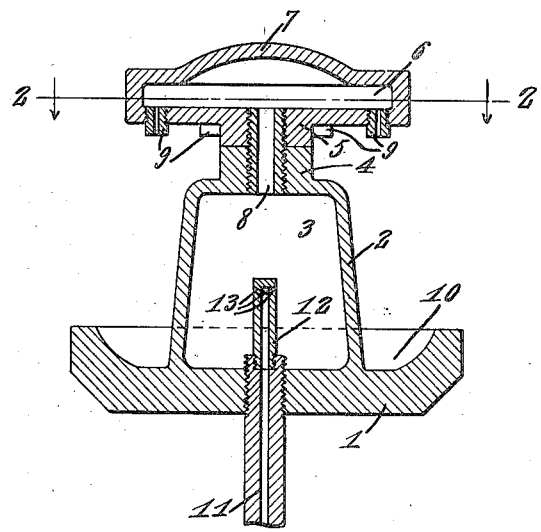
Figure 1 is a central vertical section through the vaporizer and burner.
Figure 2:
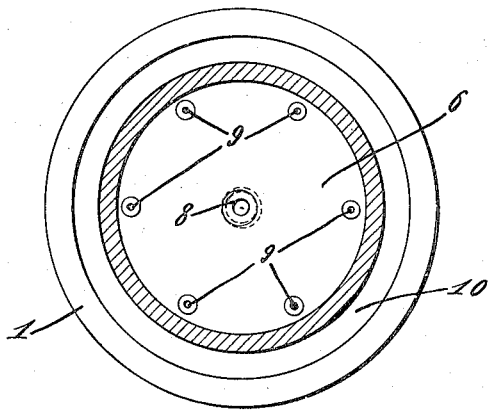
Fig. 2 is a section on line 2—2, Fig. 1.

Referring to the figures by characters of reference 1 designates a base on the central portion of which is an upstanding casing 2 forming a vaporizing chamber 3 therein. This casing has an extension 4 on the top thereof supporting the bottom 5 of a distributing chamber 6. Said chamber is preferably circular and formed with a dome-shaped top 7. A threaded screw 8 is seated within extension 4 and the center of the bottom of the distributing chamber 6 and constitutes a flexible connection between the parts.

Screwed into the bottom of the distributing chamber 6 close to the periphery thereof are nipples 9 adapted to discharge jets of fuel downwardly toward the base 1 and along the outer surface of the wall of the casing 2. A trough 10 is provided around the casing 2 by extending base 1 radially beyond this casing.

Opening through the base 1 and into the casing 2 is a supply pipe 11 and threaded into and projecting upwardly from this pipe is a nozzle 12. This nozzle is preferably closed at its inner end but has upwardly diverging outlet ports 13 near its closed end whereby small jets of fuel will be discharged along upwardly diverging lines against the wall of the casing 2. Any desired number of the nipples 9 can be employed.

In using this device the fuel is placed in the trough 10 and ignited so as to thoroughly heat the casing 2 and the walls of the distributing chamber 6. Fuel is then admitted to the nozzle 12 from the pipe 11 and will be discharged into small jets through the ports 13 and against the heated wall of the casing 2. Thus the fuel will be vaporized and will pass upwardly through the tube 8 into the distributing chamber 6 from which it will issue through the several nipples 9. Here the fuel will be ignited, the flames being discharged downwardly against the wall of the casing 2 and toward the base 1. Consequently the entire structure will soon be heated to a red heat and they will be completely enveloped in flames.

A structure such as has been described has been found especially efficient as a burner for use in heating and cooking stoves, furnaces and the like, it being possible to obtain an intense heat by the use of a heavy combustible oil.

What is claimed is:—

1. A combined vaporizer and burner comprising a casing, a priming trough extending around the casing, a distributing chamber opening at its center into the top of the casing, means for directing a plurality of jets of vaporized fuel downwardly from the distributing chamber against the outer surface of the wall of the casing and toward the trough, means for supplying fuel to the interior of the casing, and a nozzle for directing the supplied fuel in jets radially against the inner surface of the hot wall of the casing.

2. A combined vaporizer and burner comprising a base, a casing upstanding from the base, said base forming a trough extending around the casing, a supply pipe opening through the base into the casing, a nozzle for receiving fuel from said pipe, said nozzle having radial ports for directing jets of fuel radially against the wall of the casing, a distributing chamber resting on the casing, a tube engaging said casing and distributing chamber for holding them assembled, said tube constituting means of communication between the casing and the distributing chamber, a plurality of nipples connected to the bottom of said chamber for directing jets of fuel downwardly against and longitudinally of the casing toward the trough.

In testimony that I claim the foregoing as my own, I have hereto affixed my signature in the presence of two witnesses.

SILAS G. WRAY.

Witnesses:
WALTER W. KROGER,
W. H. SCHULTZ.